United States Patent
Ferguson et al.

(10) Patent No.: US 11,590,953 B2
(45) Date of Patent: Feb. 28, 2023

(54) SUPPORT ELEMENT, SUPPORT ASSEMBLY, BRAKE BOOSTER AND METHOD

(71) Applicant: Robert Bosch GmbH, Stuttgart (DE)

(72) Inventors: Ben Ferguson, Rettenberg (DE); Ignaz Hatt, Buchenberg (DE)

(73) Assignee: Robert Bosch GmbH, Stuttgart (DE)

( * ) Notice: Subject to any disclaimer, the term of this patent is extended or adjusted under 35 U.S.C. 154(b) by 280 days.

(21) Appl. No.: 16/836,983

(22) Filed: Apr. 1, 2020

(65) Prior Publication Data
US 2020/0353912 A1  Nov. 12, 2020

(30) Foreign Application Priority Data
May 9, 2019 (DE) .......................... 102019206661.5

(51) Int. Cl.
*B60T 13/74* (2006.01)
*F16M 13/02* (2006.01)

(52) U.S. Cl.
CPC .......... *B60T 13/745* (2013.01); *F16M 13/02* (2013.01)

(58) Field of Classification Search
CPC ........ B60T 13/12; B60T 13/745; B60T 11/18; F16M 13/02
USPC .......... 267/139, 140, 141.1–141.5, 152, 153, 267/161, 162, 164; 303/114.3
See application file for complete search history.

(56) References Cited

U.S. PATENT DOCUMENTS

| | | | | |
|---|---|---|---|---|
| 4,002,315 A | * | 1/1977 | Van Goubergen | F16F 3/093 248/633 |
| 6,296,237 B1 | * | 10/2001 | Nagai | F16F 9/58 267/140 |
| 6,749,047 B2 | * | 6/2004 | Koyano | F16F 9/38 280/155 |
| 7,182,190 B2 | * | 2/2007 | Asadi | F16F 9/585 188/322.18 |
| 8,016,275 B2 | * | 9/2011 | Ting | F16F 1/376 267/140 |
| 8,191,692 B2 | * | 6/2012 | Mori | F16F 9/585 267/179 |
| 8,333,269 B2 | * | 12/2012 | Dickson | B60G 13/003 267/293 |
| 8,622,374 B2 | * | 1/2014 | Kieffer | B66B 5/282 267/141.1 |
| 2010/0044970 A1 | * | 2/2010 | Suzuki | F16J 15/061 277/592 |
| 2019/0047531 A1 | * | 2/2019 | Nagel | B60T 13/745 |
| 2020/0282967 A1 | * | 9/2020 | Sellinger | B60T 11/16 |

FOREIGN PATENT DOCUMENTS

| | | | | |
|---|---|---|---|---|
| DE | 19610834 C1 | * | 6/1997 | ............. B60T 11/16 |
| DE | 102019217985 A1 | * | 5/2021 | ............. B60T 13/74 |

* cited by examiner

*Primary Examiner* — Christopher P Schwartz
(74) *Attorney, Agent, or Firm* — Norton Rose Fulbright US LLP; Gerard Messina

(57) ABSTRACT

A support element for positioning a first element, in particular a cover, on a second element, in particular a housing, includes an annular disk-shaped base body that can be positioned on a support rod fastened on the second element, the base body having on a first end face a support surface for making supporting contact with the first element, where the support element has, on the first end face, a plastically deformable projection forming the support surface.

10 Claims, 2 Drawing Sheets

SUPPORT ELEMENT, SUPPORT ASSEMBLY, BRAKE BOOSTER AND METHOD

CROSS-REFERENCE TO RELATED APPLICATIONS

The present application claims priority under 35 U.S.C. § 119 to DE 10 2019 206 661.5 filed in the Federal Republic of Germany on May 9, 2019, the content of which is hereby incorporated by reference herein in its entirety.

FIELD OF THE INVENTION

The present invention relates to a support element for positioning a first element, in particular a cover, on a second element, in particular a housing, the support element having an annular disk-shaped base body and being able to be positioned on a support rod that is able to be fastened or is fastened on the second element, the base body having on a first end face a support surface for making supporting contact with the first element.

The present invention furthermore relates to a support assembly for an electrically operated brake booster that has a first element developed as a cover and a second element developed as a housing, the cover being situated on the housing, the support assembly (a) having at least one support rod fastened on the housing, (b) extending from the housing to a cover section of the cover, and (c) having a support element that is supported or held between the support rod and the cover section in order to support the cover on the support rod.

The present invention further relates to a method for producing a support element and, respectively, a support assembly, as these were described above.

BACKGROUND

Electrically operated brake boosters for motor vehicles often have a multi-part housing, a cover being frequently positioned on a gear housing that protects components of the brake booster situated outside of the gear housing, such as a return spring for example, against external influences. The cover in this instance abuts single-endedly on the housing, an elastically deformable sealing element, in particular in the form of an annular silicon seal, normally being interposed. In order to be able to do without screw connections in the area of the silicon seal, the cover rests on support elements that, in turn, rest at a distance from the sealing area on support rods fastened on the gear housing. The support elements absorb forces acting on the cover and thereby prevent the silicon seal from being overloaded. In order to be able to ensure an optimal fit of the cover with respect to the silicon seal and to satisfy the attendant gap dimension requirements, it is known to design the support element as a support nut that is screwed onto a free end of the support rod so as to make it possible to adjust the height of the support surfaces formed by the support nut and thereby the distance from the gear housing in optimal fashion by turning the support nuts. Although this makes it possible to adjust the gap dimension precisely, the adjustment process is time-consuming.

SUMMARY

According to an example embodiment of the present invention, a support element is provided that has an advantage of making it possible to eliminate the time-consuming adjustment process and to speed up and facilitate the installation. For this purpose, the support element has on a first end face a plastically deformable projection forming a support surface. By the plastic deformation of the projection, the height of the support element itself is adaptable or adapted to the desired gap dimension. The gap dimension is thereby not adjusted by the positioning of the support element on the support rod, but rather by the support element itself. A rotation of the support element for adjusting the gap dimension is thus eliminated, which speeds up the installation process significantly. In one simple process step, prior to the installation of the support element on the support rod, the deformation of the projection produces the individual adjustment of the support element to the desired gap dimension, which can differ depending for example on boundary conditions, housing shapes, and/or manufacturer requirements.

The projection is preferably designed to be annular and coaxial with respect to the base body. The projection thereby forms a stable support surface for the base body. This ensures a uniform load of the support element and securely prevents an incorrect installation.

The projection preferably has a trapezoidal cross section. By application of an appropriate force, for example in a pressing device, the trapezoidal cross section allows for a simple deformation of the projection in such a way that the height of the projection is reduced in order to achieve a fit of the gap dimension.

The projection is preferably plastically deformable only by a force that is greater than the expected supporting force. This ensures that the position of the cover is not alterable in the normal operation of brake booster and that the support by the support element is permanently ensured.

On the second end face facing away from the first end face, the base body preferably has a stop for the axial abutment on a radial projection of the support rod. If the base body or the support element is axially supported or locked between the support rod on the one hand and the cover on the other hand, the force is transmitted from the cover through the support element onto the support rod. This permanently ensures a secure and robust support of the cover on the housing or of the first element on the second element. The (axial) stop optionally protrudes from the base body.

An example embodiment of the present invention is directed to a support assembly that includes the described support element, yielding the described advantages.

In particular, the support element is slid onto the support rod up to a radial projection of the support rod. Forces acting on the support element, which act parallel to the axial extension of the support rod, are thereby advantageously absorbed by the support rod and introduced into the second element. The radial projection is preferably designed in one piece with the support rod. This ensures a simple installation. Alternatively, the radial projection is preferably designed as a separate component, for example in the form of a pin extending crosswise through the support rod.

The radial projection is particularly preferably designed to be annular and coaxial with respect to the support rod. This yields an advantageously planar and uniform application of force by the annular support element on the support rod. This ensures a secure transfer of force as well as a long service life of the support assembly.

An example embodiment of the present invention is directed to a brake booster that includes the described support assembly, yielding the described advantages.

An example embodiment of the present invention is directed to a method for producing a support element for a support assembly, as described above, where the method includes providing a base body having a first end face with a plastically deformable projection, where the deformation is designed as a function of a gap dimension requirement between the first and the second element, in particular when the first element is pressed in the direction of the first end face. This yields the advantages already mentioned. In particular, the projection is formed in one piece with the base body in the production of the support element, which makes it possible to transfer even great forces from the first element through the support element onto the second element or the support rod. Particularly preferably, the support element is inserted into a press or pressing device and a force is applied to it axially that is greater than the force possibly occurring in the support application. In the process, the projection is formed and/or developed in such a way that it cannot be deformed by the force possibly occurring in operation.

Further advantages and preferred features and feature combinations result from what was described above as well as from the claims. The present invention is elucidated below in greater detail with reference to the drawings.

DETAILED DESCRIPTION

Figure 1:
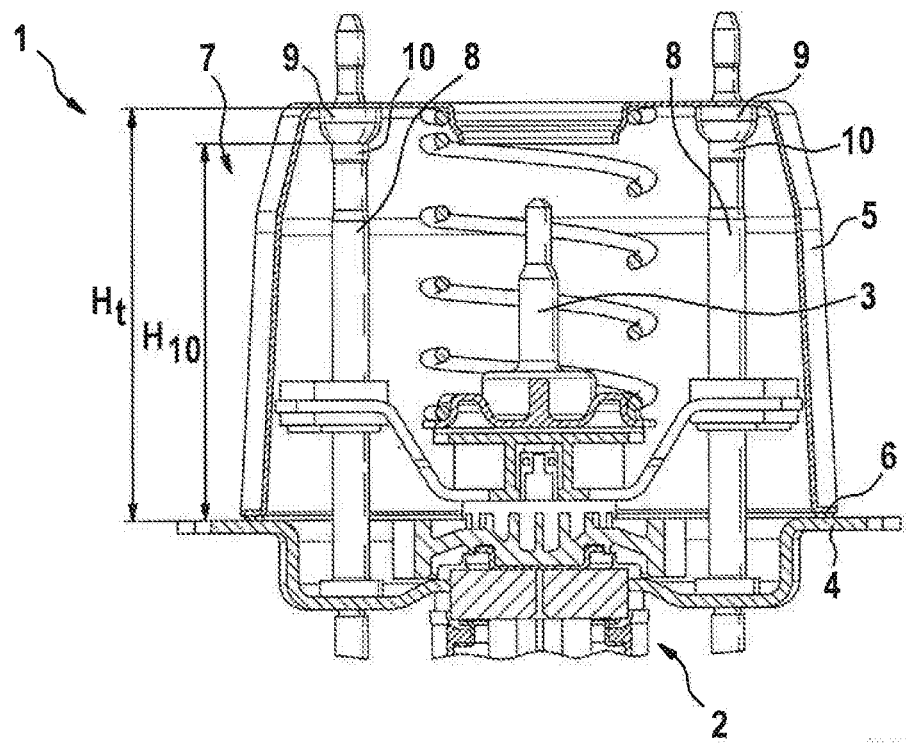
FIG. 1 illustrates an electrically operated brake booster in a simplified representation of a longitudinal section, according to an example embodiment of the present invention.

FIG. 1 shows, in a simplified longitudinal sectional view, a brake booster 1 of a brake system of a motor vehicle that is not shown in more detail. Brake booster 1 is designed as an electromotively operated brake booster that has a gear unit 2 that makes it possible to displace a push rod 3 axially in order to increase a brake pressure both by way of an electric motor as well as mechanically by way of a brake pedal. Push rod 3 is situated outside a gear housing 4 enclosing gear unit 2 and is coupled, for example, to a master brake cylinder of a hydraulic brake system. The master brake cylinder is not shown here.

In order to prevent the hydraulic fluid from escaping from the master brake cylinder into the environment, the connecting area is sealed by a cover 5 that is able to accommodate the master brake cylinder regionally. For this purpose, cover 5 has a cup-shaped design and abuts with its open end face on housing 4, its bottom side facing away from housing 4 having a central opening for accommodating the master cylinder in particular in a fluid-tight manner. A silicon seal 6 is situated between housing 4 and cover 5, which extends in annular fashion along the cover edge 5 and thereby securely prevents hydraulic fluid from escaping from the area between cover 5 and housing 4.

In order to ensure the gap dimension requirements for silicon seal 6, cover 5 is additionally retained on housing 4 by a support assembly 7. Support assembly 7 has two support rods 8 that are respectively firmly connected to housing 4 and protrude from housing 4 parallel to push rod 3. On their free ends, support rods 8 respectively have a support element 9 that is respectively braced, on the one hand, against the associated support rod 8 and, on the other hand, against cover 5 in the bottom area of cover 5.

While in known solutions support elements 9 are designed as screw nuts that are able to be screwed onto support rods 8 in order to adjust the position of support elements 9 viewed in the longitudinal extension of support rods 8 in such a way that an optimal gap dimension is ensured for silicon seal 6, the present support assembly 7 provides a simpler solution that is in particular easier to install.

According to the present example embodiment, support elements 9 are merely slid or plugged onto support rods 8 and abut axially on a radial projection 10 of the respective support rod 8.

Figure 2:
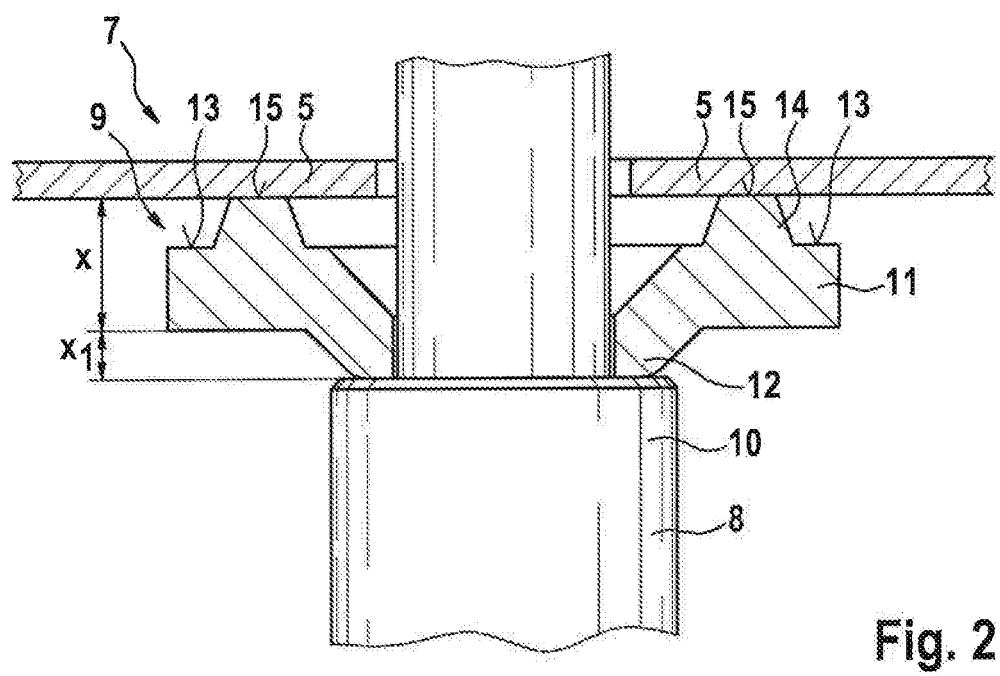
FIG. 2 is a detail view of a support assembly of the brake booster, according to an example embodiment of the present invention.

In an enlarged sectional view, FIG. 2 shows a support element 9 of support assembly 7 situated on a support rod 8. Support element 9 has an annular base body 11 that has an axial stop 12 for abutment on radial projection 10. Axial stop 12 is designed to be coaxial with respect to base body 11 and extends across the entire circumference so that it forms an annular support surface for radial projection 10.

On the end face 13 facing away from radial projection 10, base body 11 has a projection 14 that has a trapezoidal cross section and that extends in annular fashion over base body 11, coaxially to the latter, and coaxially to support rod 8. According to the present example embodiment, projection 14 is designed in one piece with base body 11. On its free end face, projection 14 forms a support surface 15 for abutment on the inner side of cover 5 so that the gap dimension of cover 5 to housing 4 results from the position and height of support surface 15 on support rod 8.

For setting the gap dimension, prior to the installation of support element 9, a measurement is made of the distance $H_{10}$ of the support surface of radial projection 10 of support rod 8 from housing 4 in the area on which silicon seal 6 is to be applied. Furthermore, the actual height of support element 9 in the axial direction is ascertained, which is composed of the height x and $x_1$. The height $x_1$ is the height of the projection of axial stop 12 of base body 11 on the end face of base body 11 facing radial projection 10. The height x corresponds to the height of support element 9 starting from the lower end face up to support surface 15, as shown in FIG. 2.

The distance $H_t$, relevant and desired for the gap dimension, of support surface 15 from the outer side of housing 4, on which silicon seal 6 is to be applied, is known or is ascertained through calculations. The distances x and $x_1$ are advantageously measured. Optionally, the total height of support element 9 is also detected and measured from the axial stop 12 up to support surface 15.

In order to obtain the desired gap dimension for silicon seal 6, support element 9 is inserted into a press prior to installation on support rod 8.

Figure 3:
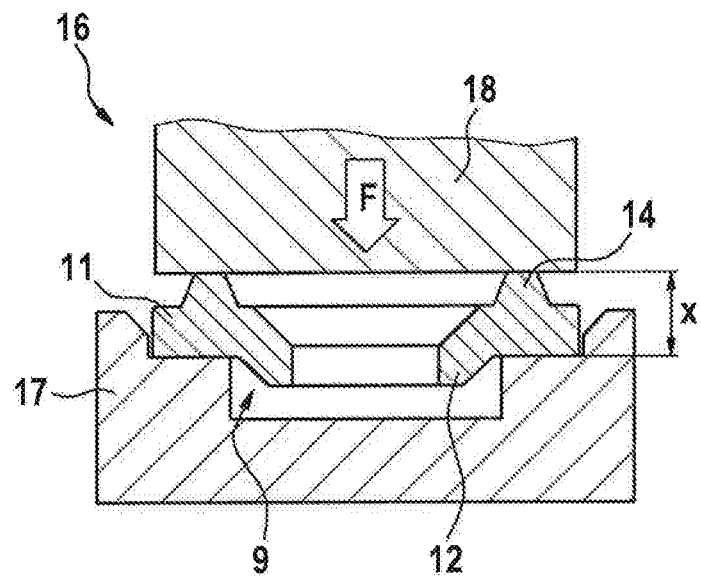
FIGS. 3 and 4 illustrate a method for producing a support element of the support assembly, according to an example embodiment of the present invention.
Figure 4:
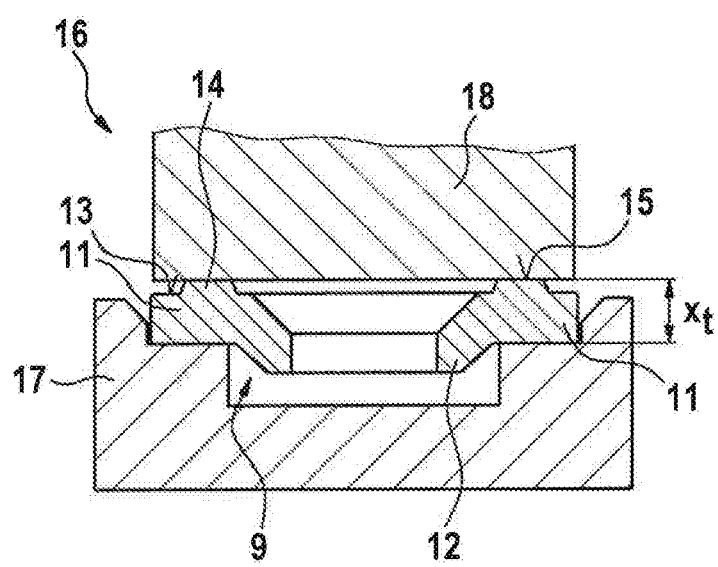

FIGS. 3 and 4 show in simplified illustrations a pressing device 16 for producing or finishing support element 9. This device 16 is designed as a press, which has a bearing receptacle 17 for support element 9, in which support element 9 can be positioned in such a way that it rests with base body 11 on bearing receptacle 17 so that the axial stop 12 protruding from the lower end face is freely suspended in space, as shown in FIG. 4. Device 16 furthermore has a press stamp 18, on which a force is able to be applied, that is displaceable according to arrow F in the direction of the bearing receptacle 17 in order to press projection 14 in the direction of base body 11 $i$, as shown in FIG. 4, whereby the original height x of support element 9 is reduced to a height $x_t$. The height $x_t$ to be set is calculated as follows:

$x_t = H_t - H_{10} - x_1$

By the plastic deformation of projection 15, support element 9 is thus brought to the desired target dimension $x_t$. Subsequently, support disk 9 is plugged onto support rod 8, whose radial projection 8 was measured for determining the distance $h_{10}$. As a result of the advantageous machining, the support surface 15 is now at the desired height $H_t$, so that when cover 5 is slid onto support element 9, the desired gap dimension for silicon seal 6 is achieved.

The shape as well as the material properties of support element 9 are expediently selected so that it is possible to perform the process for the plastic deformation of projection 14 described with reference to FIGS. 3 and 4, but that the forces or surface pressures occurring in the normal operation of brake booster 1 do not result in a further plastic deformation of projection 14 or of support element 9 as a whole.

What is claimed is:

1. A support for supporting a first element on a second element, the support comprising:
   an annular disk-shaped base body (a) that is structured for positioning on a support rod that can be fastened on the second element, and (b) a first end face of which includes a plastically deformable projection forming a support surface for making supporting contact with the first element, wherein the first element is a cover, and wherein the projection is plastically deformable only by a force that is greater than a supporting force generated by supporting the cover.

2. The support element of claim 1, wherein the projection is annular and coaxial relative to the base body as a whole.

3. The support element of claim 1, wherein the projection is trapezoidal in cross section.

4. The support element of claim 1, wherein a second end face of the base body that faces away from the first end face includes a stop configured to form an axial abutment on a radial projection of the support rod.

5. The support element of claim 1, wherein the second element is a housing.

6. A support assembly for an electrically operated brake booster, the support assembly comprising:
   a housing;
   a cover situated on the housing;
   a support rod that is fastened onto the housing and that extends from the housing to a region at a bottom of the cover; and
   a support supporting the cover and including an annular disk-shaped base body (a) that is positioned on the support rod, and (b) a first end face of which includes a plastically deformable projection forming a support surface making supporting contact with the bottom of the cover, wherein the projection is plastically deformable only by a force that is greater than a supporting force generated by supporting the cover.

7. The support assembly of claim 6, wherein the support element is slid onto the support rod up to a radial projection of the support rod.

8. The support assembly of claim 7, wherein the radial projection is annular and coaxial relative to the support rod.

9. The support element of claim 6, wherein a second end face of the base body that faces away from the first end face includes a stop that abuts a radial projection of the support rod (8).

10. A method for providing a support for supporting a cover on a housing, the method comprising:
    deforming a plastically deformable projection of a first end face of a base body of the support as a function of a dimension of a gap required between the cover and the housing when the cover is pressed towards the first end face, wherein the projection is plastically deformable only by a force that is greater than a supporting force generated by supporting the cover.

* * * * *